UNITED STATES PATENT OFFICE.

ARTHUR WEINBERG AND RICHARD HERZ, OF FRANKFORT-ON-THE-MAIN, GERMANY, ASSIGNORS TO LEOPOLD CASSELLA & CO., OF FRANKFORT-ON-THE-MAIN, GERMANY.

BLUE SULFUR DYE AND PROCESS OF MAKING SAME.

SPECIFICATION forming part of Letters Patent No. 693,632, dated February 18, 1902.

Application filed January 5, 1901. Serial No. 42,212. (Specimens.)

*To all whom it may concern:*

Be it known that we, ARTHUR WEINBERG and RICHARD HERZ, citizens of Prussia, and residents of Frankfort-on-the-Main, in the Province of Hesse-Nassau, Kingdon of Prussia, Germany, have invented certain new and useful Improvements in Blue Sulfur Dyes and Processes of Making Same, of which the following is a specification.

We have found that by heating paradialkylamido paraoxydiphenylamins with sulfur and alkaline sulfids under certain conditions hereinafter specified blue dyestuffs of very bright shade result. In the manufacture of these coloring-matters great care must be taken that the temperature during the so-called "melting" process does not exceed much 140° centigrade, as otherwise (to a large extent or almost exclusively) bluish-black to blackish coloring-matters of less value result instead of the pure blue dyestuffs. In the production of this color on a technical scale it is, however, difficult to entirely avoid the formation of these blackish by-products even if the above-mentioned conditions are carefully observed. It is therefore of importance to find a reliable method of completely separating the pure dyestuff from the blackish dyeing products. This is accomplished by means of the property possessed by the salts of the leuco compound of the pure blue of dissolving in water free from inorganic salts, whereas the by-products combine neither as such nor as leuco compounds with mineral acids. If the raw melt of the dyestuff is neutralized with muriatic acid until no more dyestuff remains in solution, the coloring-matters separate in the shape of leuco bases. If these are filtered off and completely washed out with water, then, provided every excess of acid is avoided, the chlorhydrate of the pure leuco blue can be brought into solution with dilute muriatic acid, whereas the impure coloring-matters remain totally undissolved. By means of a very small quantity of common salt or a little excess of muriatic acid the chlorhydrate of the leuco compound can be separated from the solution as a yellowish-white precipitate. By adding an excess of caustic-soda lye to the solution of the chlorhydrate the leuco compound is dissolved, and by absorbing oxygen this solution at once assumes a dark-blue shade, and if air is conducted through the same the coloring-matter gradually separates as a dark-blue precipitate. Instead of oxidizing in an alkaline solution the solution of the leuco-chlorhydrate may be oxidized with chlorid of iron or chromate, in which case the coloring-matter separates direct as a blue precipitate. The dried dyestuff obtained is a dark-blue powder which easily assumes a bronzy luster. It dissolves in concentrated sulfuric acid with a blue shade. If this solution is diluted, the coloring-matter separates in the shape of blue flakes. It dissolves easily in diluted soda-lye, especially in the presence of sulfid of sodium, and dyes direct on cotton fast and pure blue shades in the presence of caustic lye or alkaline sulfids.

The soluble leuco-chlorhydrate can be fixed on cotton previously mordanted with tannin and subsequently be developed by means of oxidizing agents. The leuco compound is further very suitable for dyeing wool.

The process is illustrated by the following example: Twenty-five kilos dimethylamido-oxydiphenylamin are heated with fifty kilos sulfid of sodium and 12.5 kilos sulfur for twenty-four hours to about 115° centigrade. The melt is dissolved in about one thousand liters of water and muriatic acid is introduced into the solution. Thereby sulfureted hydrogen is evolved, which reduces the color to its leuco compound. The adding of muriatic acid is continued until the leuco compound is completely precipitated. The precipitate is then filtered off and well washed with water. The exact amount of muriatic acid which is necessary to dissolve the same is ascertained from an average sample. The precipitate is then dissolved in the thus-determined quantity of muriatic acid and one thousand liters of water at about 80° centigrade, and the brownish-colored solution is filtered off from the insoluble residue. By the addition of one hundred liters salt water the chlorhydrate of the leuco blue, which is best used in paste form, is separated from this solution or twenty kilos caustic-soda lye of 40° Baumé are added to the solution and air is conducted through the same. When all is oxidized, the excess of soda-lye is neutralized and the separated dyestuff is filtered off. The thus-obtained dyestuff has in a dry state the form of a copperish shining powder, dissolving with a blue color in concentrated sulfuric acid. It is easily soluble in water if caustic alkalies or alkaline sulfids are present. It dyes unmordanted cotton from those solutions in bright-blue shades fast to light, washing, acids, and chlorin.

Having now described our invention and in what manner the same is to be performed, what we claim is—

1. The process of producing pure blue sulfur dyestuffs by heating paradialkylamido paraoxydiphenylamin of the constitution

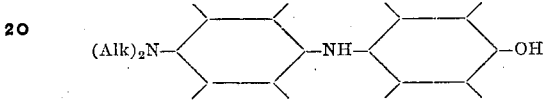

with sulfur and alkaline sulfids and isolating the pure color from the crude melt by dissolving it in water, precipitating with acids, redissolving the precipitate in diluted mineral acids, filtering the thus-obtained solution of the pure leuco compound and oxidizing the same substantially as described.

2. The new blue coloring-matter hereinbefore described derived from paradialkylamido paraoxydiphenylamin of the constitution

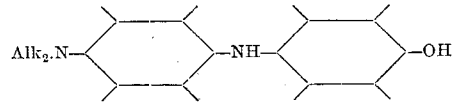

which in a dry state is a dark-blue bronzy powder dissolving in concentrated sulfuric acid with a blue color, easily soluble in solutions containing caustic alkalies or alkaline sulfids and dyeing unmordanted cotton from those solutions bright-blue shades fast to light, acids, washing and chlorin, substantially as described.

Signed at Frankfort-on-the-Main, in the Province of Hesse-Nassau and Kingdom of Prussia, this 5th day of December, A. D. 1900.

ARTHUR WEINBERG.
RICHARD HERZ.

Witnesses:
JEAN GRUND,
CARL GRUND.